US007900449B2

(12) United States Patent
Tröndle et al.

(10) Patent No.: US 7,900,449 B2
(45) Date of Patent: Mar. 8, 2011

(54) VIBRATION SUPPRESSOR

(75) Inventors: Alfons Tröndle, Dogern (DE); Balz Flury, Würenlos (CH); Christoph Mathey, Fislisbach (CH)

(73) Assignee: Wartsila Finland OY, Vaasa (FI)

(*) Notice: Subject to any disclaimer, the term of this patent is extended or adjusted under 35 U.S.C. 154(b) by 0 days.

(21) Appl. No.: 11/607,981

(22) Filed: Dec. 4, 2006

(65) Prior Publication Data

US 2007/0151242 A1 Jul. 5, 2007

(30) Foreign Application Priority Data

Jun. 3, 2004 (EP) .................................... 04405340

(51) Int. Cl.

| | |
|---|---|
| ***F02D 23/00*** | (2006.01) |
| ***F04D 29/70*** | (2006.01) |
| ***F02M 35/16*** | (2006.01) |
| ***F02M 39/02*** | (2006.01) |
| ***F16M 1/00*** | (2006.01) |
| ***F16M 11/00*** | (2006.01) |
| ***F16M 3/00*** | (2006.01) |
| ***F16M 5/00*** | (2006.01) |
| ***F16M 7/00*** | (2006.01) |

(52) U.S. Cl. ......... 60/605.1; 248/603; 248/605; 248/666

(58) Field of Classification Search ................. 60/605.1; 248/603, 605, 666; 181/214; 442/6; *F02M 35/16, F02M 39/02; F04D 29/70*
See application file for complete search history.

(56) References Cited

U.S. PATENT DOCUMENTS

| | | | | |
|---|---|---|---|---|
| 2,214,942 | A * | 9/1940 | Taub | 248/605 |
| 3,773,285 | A * | 11/1973 | Morrill | 248/603 |
| 3,844,321 | A | 10/1974 | Cook | |
| 3,930,568 | A * | 1/1976 | Levey | 193/38 |
| 4,235,303 | A * | 11/1980 | Dhoore et al. | 181/214 |
| 5,203,293 | A * | 4/1993 | Shintani et al. | 248/666 |
| 5,501,075 | A * | 3/1996 | Spies et al. | 60/605.1 |
| 5,624,099 | A * | 4/1997 | Spies et al. | 60/605.1 |
| 6,488,488 | B2 * | 12/2002 | Achtelik et al. | 418/47 |
| 6,551,057 | B1 * | 4/2003 | Haaser et al. | 415/119 |
| 2006/0014451 | A1 * | 1/2006 | Muller | 442/6 |

FOREIGN PATENT DOCUMENTS

| | | | |
|---|---|---|---|
| DE | 44 13 393 | C1 | 6/1995 |
| DE | 197 08 759 | A1 | 11/1997 |
| DE | 19924675 | A1 * | 11/2000 |

(Continued)

OTHER PUBLICATIONS

A Fully Certified English Translation of EP 1 186 781 Al, published on Mar. 13, 2002.*

(Continued)

*Primary Examiner* — Thai Ba Trieu
(74) *Attorney, Agent, or Firm* — Buchanan Ingersoll & Rooeny PC

(57) ABSTRACT

A vibration suppressor and a vibration damper are configured in a system including an internal combustion engine and an exhaust-gas turbo charger. The vibration suppressor and vibration damper are secured to an exposed place on the system which is subjected to strong vibrations. As the vibrations are the strongest in said area, the vibration reducer can be used to a maximum. The system including the internal combustion engine and the exhaust-gas charger is enhanced in such a manner that the internal combustion engine can be operated in all of the rotational speed ranges without reducing the service life of individual components or the entire system.

4 Claims, 3 Drawing Sheets

FOREIGN PATENT DOCUMENTS

| | | | | |
|---|---|---|---|---|
| DE | 102 55 019 | A1 | | 6/2004 |
| EP | 0 214 825 | A2 | | 3/1987 |
| EP | 1 060 932 | A2 | | 12/2000 |
| EP | 1186781 | A1 | * | 3/2002 |
| GB | 2050507 | A | * | 1/1981 |
| GB | 2312655 | A | * | 11/1997 |
| JP | 2001200767 | A | * | 7/2001 |
| JP | 2002221115 | A | * | 8/2002 |
| WO | WO 2008023033 | A1 | * | 2/2008 |

OTHER PUBLICATIONS

A Machine Translation the reference to Battig EP 1186781 A1 published on Mar. 13, 2002.*

International Search Report having the date of actual completion on Jul. 4, 2005.

* cited by examiner

VIBRATION SUPPRESSOR

RELATED APPLICATIONS

This application claims priority under 35 U.S.C. §119 to EP Application 04405340.3 filed in Europe on 3 Jun. 2004, and as a continuation application under 35 U.S.C. §120 to PCT/CH05/000307 filed as an International Application on 1 Jun. 2005 designating the U.S., the entire contents of which are hereby incorporated by reference in their entireties.

FIELD

Supercharged internal combustion engines are disclosed. For example, a device is disclosed for reducing vibrations on a system comprised of an internal combustion engine and a supercharging device, a supercharging device for supercharging of an internal combustion engine, and a system comprised of an internal combustion engine and a supercharging device.

BACKGROUND INFORMATION

Systems comprised of an internal combustion engine and supercharging device, for example an exhaust gas turbocharger, depending on their installation site, have natural structural frequencies which are excited by the ignition frequency of the engine and/or multiples of the rated engine rpm. If these resonances are in the operating range of the engine, the engine with the exhaust gas turbocharger can vibrate unduly strongly.

For engines with a constant rpm the resonance can be shifted away from the rpm by changing the system stiffness and natural structure frequency. On variable rpm engines conversely there can be several resonances in the intended operating range. Then high vibrations often occur which can lead to a reduction of the service life of individual components or of the entire system.

In order to meet the high demands of final customers and classification societies, certain vibration boundary values on the engine block and exhaust gas turbocharger should be maintained. If it is not possible to drop below the vibration boundary values of the manufacturers or classification societies over the entire rpm range by changing the natural frequencies, certain rpm ranges of the engine should be blocked for operation to avoid damage. This can cause disadvantages for the operator. To date no mechanical remedies are known or have been studied for effectively reducing vibrations.

SUMMARY

A system is disclosed which is composed of an internal combustion engine and a supercharging device in which the internal combustion engine can be operated in the entire available rpm range without reducing the service life of individual components or of the entire system by the vibrations which arise in this connection.

Vibration-reducing means, for example in the form of a vibration suppressor or vibration damper, are added to the system comprised of an internal combustion engine and a supercharging device.

The vibration suppressor and/or the vibration damper can be mounted on an exposed, strongly vibrating site in the system, since the vibrations are strongest there and thus the vibration-reducing means can be used effectively.

Since the supercharging device can be mounted at an exposed location on the internal combustion engine, it can be effective to mount the vibration-reducing means on the supercharging device, in the case of an exhaust gas turbocharger for example on the filter muffler on the air inlet side of the compressor housing.

BRIEF DESCRIPTION OF THE DRAWINGS

Various embodiments are shown schematically and detailed below using the figures. In all figures identically acting elements are provided with the same reference numbers.

DETAILED DESCRIPTION

Figure 1:
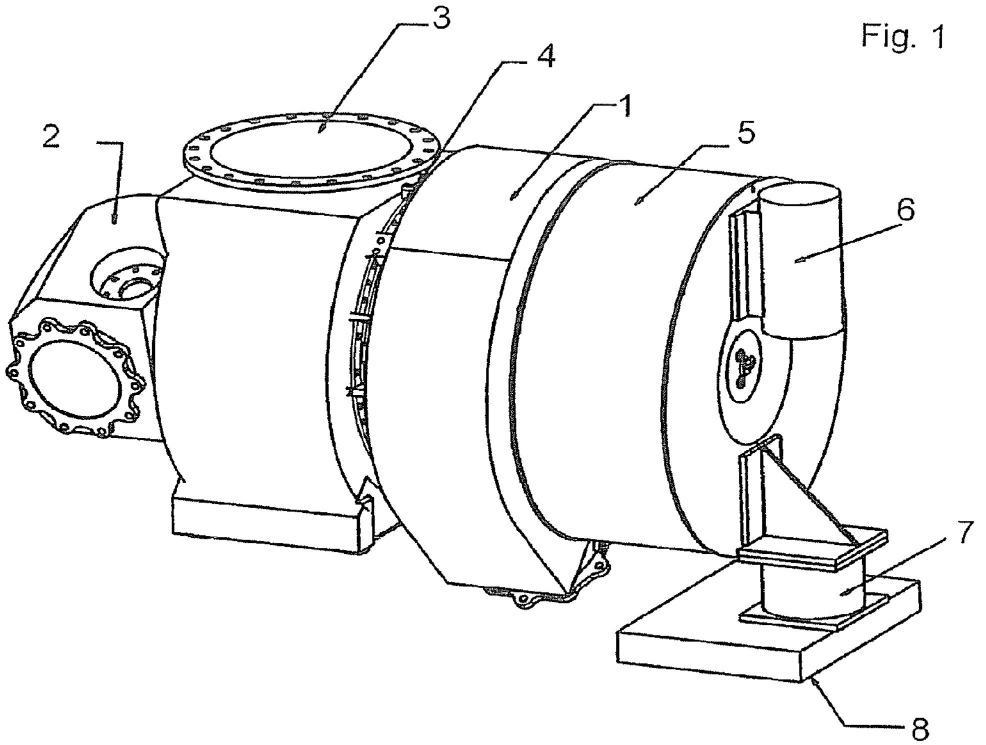
FIG. 1 shows a view of an exemplary exhaust gas turbocharger with a first exemplary embodiment of a device for reduction of vibrations.

By mounting a damped vibration suppressor or a vibration damper at exposed locations at which the vibrations are strongest, the vibrations of the internal combustion engine and supercharging device can be effectively reduced. In this example a supercharging device means an exhaust gas turbocharger. Alternatively combustion air can be supplied to the internal combustion engine but also via for example a mechanically or electrically driven compressor. The vibration-damping measures described below can also be applied to these supercharging devices.

In this connection the damper or vibration suppressor should act first of all in the direction of the primary vibrations of natural forms of the lower natural frequency of the engine-turbocharger system, i.e. generally in the direction of the turbocharger axis A which coincides with a shaft on which the compressor wheel and the turbine wheel are mounted, and an axis transversely (horizontally) thereto B.

The turbocharger can be mounted on a bracket over the engine or on the front of the engine in an exposed location. Due to this exposed location it can experience the strongest vibrations and is therefore best suited for mounting of vibration dampers and vibration suppressors.

The vibration suppressor can be made in different versions, for example as a vibrating mass on a spring. Vibration suppressors can be damped or undamped. Weakly damped and undamped vibration suppressors are designed for a certain frequency and act over a small frequency range. Highly damped vibration suppressors act like dampers over a wide frequency range.

The mass of the vibration suppressor is roughly 5-10% (or lesser or greater) of the turbocharger weight. In this way a balance is created between the damper force to be achieved and the additional weight which the charger should mechanically withstand.

Damping takes place by the damping properties of the mounting or with a separate damper. Components of the turbocharger can also be used as the vibration suppressor or vibration damper. For example a decoupled filter muffler can be used as the suppressor mass, while damping can be achieved via the mounting of the filter muffler on the compressor housing.

The suppressor mass can also be supported as a vibrating mass in a space filled with a damping, highly viscous liquid (for example, oil) or, comprising (e.g., consisting of) a loose bulk material, located in a corresponding tank. This space can be made in a rigidly mounted tank as an additional component in the system comprised of the internal combustion engine and exhaust gas turbocharger, or as an integral component in a housing cavity on the turbocharger, the bracket or the engine.

The vibration damper can be mounted on a highly vibrating part of the turbocharger and rigidly connected to the engine block, bracket or an outer mounting point. The dampers can be configured or designed depending on the application for a relatively high natural frequency (e.g., 10-100 Hz) and small vibration amplitudes (e.g., 0.1-2 mm).

Vibration suppressors and dampers can be mounted on all housings of the turbocharger, the bracket or on outer parts of the engine block. Since the temperatures are high at the gas inlet or gas outlet and the parts can be damaged, vibration dampers and suppressors should be mounted on the bearing housing, compressor housing, filter muffler, or in turbochargers without a filter muffler, on the air intake. The filter muffler itself can also be attached as a vibration suppressor, and damping can be achieved via the connection to the compressor housing.

FIG. 1 shows an exhaust gas turbocharger as is mounted on an internal combustion engine. In the figure only the outer housing parts and the connecting flanges for the supply lines to the internal combustion engine are shown. The air for the internal combustion engine is intaken via a filter muffler 5 and routed in the compressor housing 1 to the rotating compressor wheel. The compressor wheel is mounted on one end of a shaft which is pivotally mounted in the bearing housing 4. On the other end of the shaft the turbine wheel is mounted. The turbine housing comprises two parts, the gas inlet housing 2 with the supply line of the hot exhaust gases from the internal combustion engine, and the gas outlet housing 3 with the outlet flange for connecting the exhaust system. Depending on type and size, the exhaust gas turbocharger on the bearing housing or on part of the turbine housing is connected to the internal combustion engine. Alternatively the exhaust gas turbocharger can be supported with a second support, for example in the region of the filter muffler.

The internal combustion engine has a vibration suppressor 6 which is mounted on the filter muffler of the exhaust gas turbocharger, with a mass which is supported to provide damping for example in a tank in oil and is elastically supported by means of elastic elements, or is located as loose bulk material in a tank. Such a vibration suppressor/damper can also be mounted on another housing of the exhaust gas turbocharger or it can be arranged integrated in the housing of the exhaust gas turbocharger or can itself be a part of this housing.

For example, the vibration damper can be mounted with a first support on the bearing housing and with a second support on the flange connection between the compressor housing and the filter muffler. In this connection the additional mounting is used to connect the vibration suppressor/damper as stiffly as possible to the turbocharger so that vibrations are transmitted as directly as possible to the vibration damper.

At the bottom right in FIG. 1, an additional vibration damper 7 is shown which can be securely connected to the filter muffler 5 and a corresponding support (for example, bracket, engine block or external frame). The additional vibration damper optimally damps the vibrating filter muffler (site with highest amplitudes), especially when the support (8) is very stiff.

Figure 2:
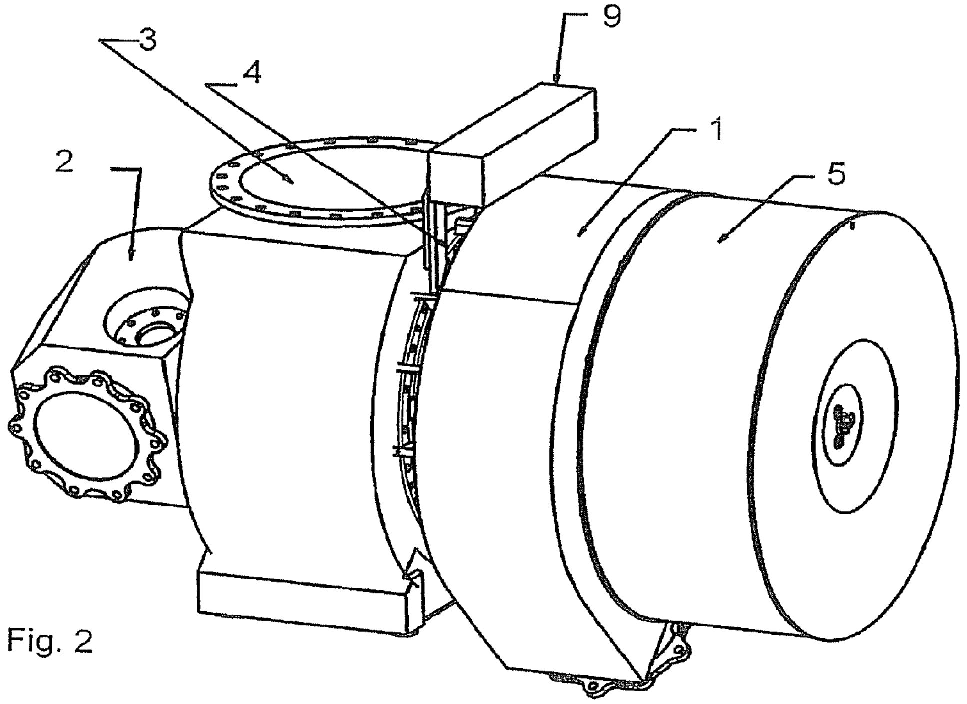
FIG. 2 shows a view of an exemplary exhaust gas turbocharger with a second exemplary embodiment of a device for reduction of vibrations.
Figure 3:
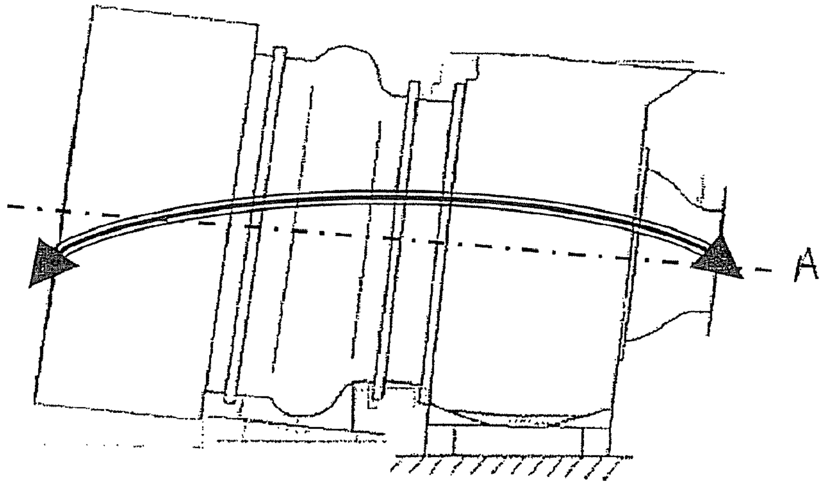
FIG. 3 shows a view of an exhaust gas turbocharger including the turbocharger axis.
Figure 4:
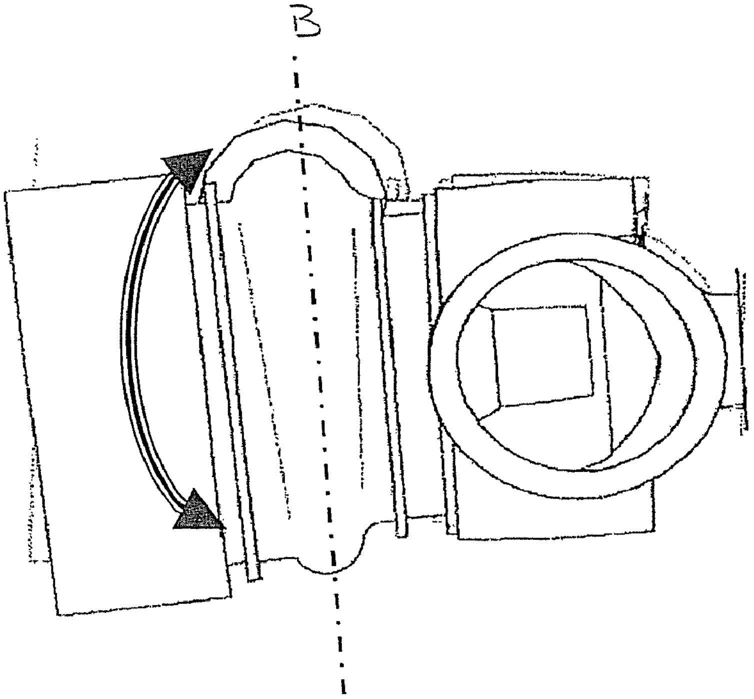
FIG. 4 shows another view of an exhaust gas turbocharger including an axis transverse to the turbocharger axis.
Figure 5:
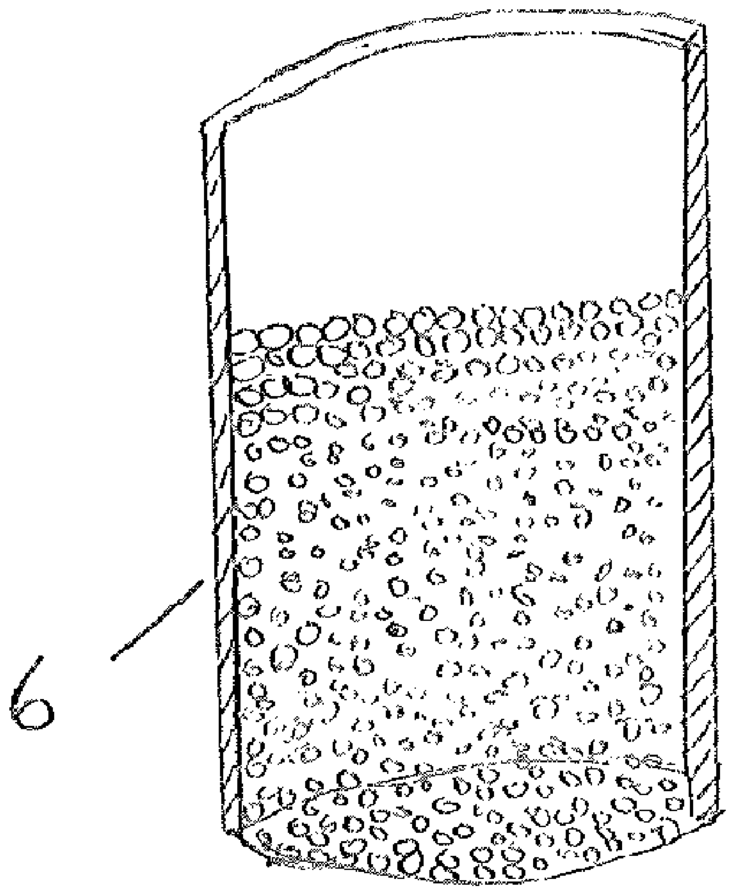
FIG. 5 shows a cross-sectional view of a vibration suppressor including a loose bulk material located in a housing cavity.

FIG. 2 shows a vibration damper 9 which is mounted on the bearing housing. Damping takes place via the material damping of the mounting (multilayer material with damping intermediate layers) or by a separate vibration damper.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCE NUMBER LIST

1 compressor housing
2 gas inlet housing
3 gas exit housing
4 bearing housing
5 filter muffler
6 vibration suppressor
7 vibration damper
8 base
9 vibration suppressor

The invention claimed is:

1. A system comprising:

an internal combustion engine;

a supercharging device, the supercharging device including a filter muffler, a compressor wheel mounted on one end of a shaft, a turbine wheel mounted on another end of the shaft, a gas inlet and a gas outlet; and a device for reducing vibrations of the system, wherein the device for reducing vibrations comprises a vibration suppressor including a loose bulk material located in a housing cavity.

2. The system as claimed in claim 1, wherein the housing cavity is formed in at least one of the internal combustion engine, the supercharging device or a bracket that mounts the supercharging device onto the internal combustion engine.

3. The system as claimed in claim 1, wherein the housing cavity is formed as a tank mounted on the supercharging device or mounted on a bracket that mounts the superchanging device onto the internal combustion engine.

4. The system as claimed in claim 1, wherein the vibration suppressor is mounted on the supercharging device on one of the bearing housing, compressor housing, filter muffler or gas inlet housing.

* * * * *